United States Patent
Weiland

(10) Patent No.: US 6,217,117 B1
(45) Date of Patent: Apr. 17, 2001

(54) COUPLING DEVICE FOR A TELESCOPICALLY ADJUSTABLE OBJECT SUCH AS A HEADREST

(75) Inventor: Holger Weiland, Amberg (DE)

(73) Assignee: Grammer AG, Amberg (DE)

( * ) Notice: Subject to any disclaimer, the term of this patent is extended or adjusted under 35 U.S.C. 154(b) by 0 days.

(21) Appl. No.: 09/423,765

(22) PCT Filed: Jun. 19, 1998

(86) PCT No.: PCT/DE98/01728

§ 371 Date: Nov. 11, 1999

§ 102(e) Date: Nov. 11, 1999

(87) PCT Pub. No.: WO99/00269

PCT Pub. Date: Jan. 7, 1999

(30) Foreign Application Priority Data

Jun. 26, 1997 (DE) .............................. 197 27 168

(51) Int. Cl.[7] .................................................. B60N 2/48
(52) U.S. Cl. ................................. 297/410; 297/61
(58) Field of Search .................................. 297/391, 410, 297/61, 336, 378.12

(56) References Cited

U.S. PATENT DOCUMENTS

| | | | |
|---|---|---|---|
| 3,462,193 | * | 8/1969 | Tamura ............................. 297/410 |
| 3,813,151 | * | 5/1974 | Cadiou ............................. 297/410 |
| 5,110,185 | | 5/1992 | Schmutz ........................... 297/410 |
| 5,836,651 | * | 11/1998 | Szerdahelyi et al. ............. 297/410 |

FOREIGN PATENT DOCUMENTS

| | | |
|---|---|---|
| 3039934 | 5/1982 | (DE) . |
| 4219941 | 12/1993 | (DE) . |
| 4306254 | 9/1994 | (DE) . |
| 297 11 138 | 10/1997 | (DE) . |
| 743224 | 11/1996 | (EP) . |

* cited by examiner

Primary Examiner—Anthony D. Barfield
(74) Attorney, Agent, or Firm—Elliot M. Olstein; Raymond J. Lillie

(57) ABSTRACT

Described is a coupling device (52) for a telescopically adjustable object such as head support, wherein the object has a first and a second body (24, 18) and the coupling device (52) is such that the first body (24) is adjustable jointly with the second body (18) along a linear guide (38, 40) between a base position and a first extension position and from the first extension position the second body (18) is only adjustable linearly relative to the first body (24) as far as a maximumm position.

2 Claims, 1 Drawing Sheet

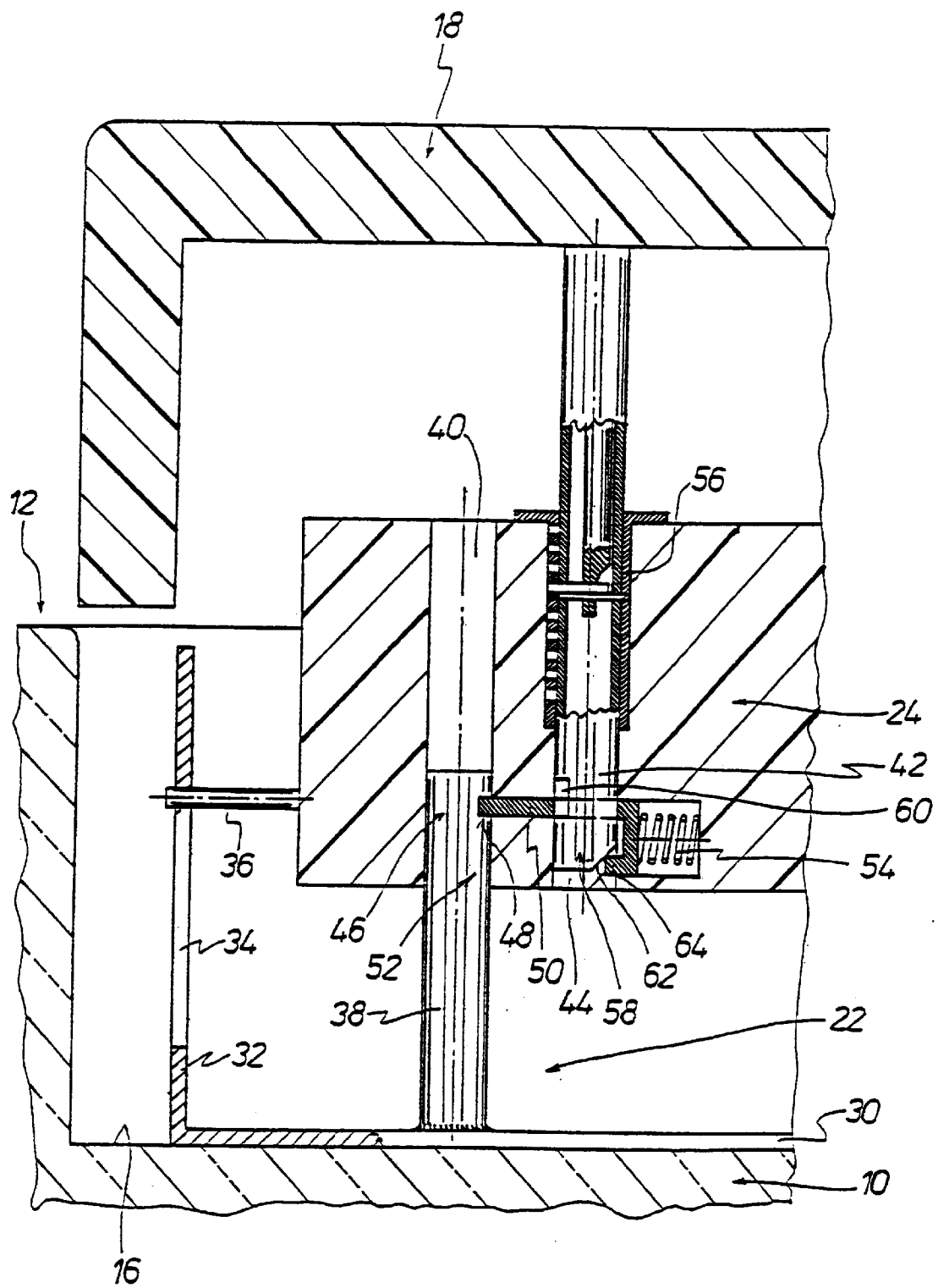

COUPLING DEVICE FOR A TELESCOPICALLY ADJUSTABLE OBJECT SUCH AS A HEADREST

The invention concerns a coupling device for a telescopically adjustable object such as a head support or the like.

Head supports for example of vehicle seats are usually connected to the backrest of the vehicle seat, and are adjustable in respect of height, by means of a connecting element. Known head supports of that kind are normally adjustable in respect of height as desired in a heightwise range of the order of magnitude of between 60 and 100 mm. That is often not adequate in particular for very tall seat occupants.

The object of the present invention is to provide a coupling device of the kind set forth in the opening part of this specification, which permits increased telescopic displacement of the object.

In a coupling device of the kind set forth in the opening part of this specification, in accordance with the invention that object is attained in that the object has a first and a second body and that the coupling device is provided in such a way that the first body can move jointly with the second body along a first linear guide between a base position and a first extension position and from the first extension position the second body is only adjustable linearly in relation to the first body as far as a maximum position. In this case the coupling device according to the invention is of such a configuration that adjustment of the second body in relation to the first body from the first extension position is made possible automatically, that is to say without the actuation of a special actuating element, in order as desired to displace the second body to a maximum position. At the same time the first body is automatically retained in the first extension position.

In the case of the coupling device according to the invention the first linear guide can have at least one stationary first bar which at its distal end portion is provided with an opening defining the first extension position, and the first body can have a spring-loaded slider which forms the coupling device and which in the first extension position engages into the opening in the first bar. In this arrangement the first body can have at least one passage for linear guidance of an associated second bar of the second body and the second body can be provided at its distal end portion with an aperture for the slider. The said slider is therefore desirably provided transversely with respect to the first and the second bars and is displaceable in the first body transversely with respect to the first and the second bars in order to engage either into the opening at the distal end portion of the first bar or into the aperture at the distal end portion of the second bar.

The second bar can be provided at its distal end with an inclined surface and upon contraction of the object from the maximum position back into the first extension position the slider can be displaced with a contact portion against the inclined surface in such a way that the slider is released from the opening in the first bar and at the same time engages into the aperture in the second bar and connects the second body to the first body. That connection then therefore provides that, from the first extension position back to the base position, the second body is displaceable with the first body jointly back into the base position.

The coupling device according to the invention is of a simple configuration and has only a few individual parts, which is advantageous from assembly points of view.

Further details, features and advantages will be apparent from the description hereinafter of an embodiment of the coupling device for a telescopically adjustable object in the form of a head support, as diagrammatically illustrated in a sectional view in the drawing.

The FIGURE shows a view in section of parts of a backrest 10 of a vehicle seat 12. The backrest 10 is provided with an opening 16 which is intended to accommodate a head support 18, the head support 18 being combined with an intermediate body 24. In this arrangement the intermediate body 24 forms a first body and the head support 18 forms a second body.

Disposed in the opening 16 is a base arrangement 22 which is fixed with respect to the seat or backrest and which has a bottom element 30 and side elements 32 projecting from the bottom element 30 at the sides thereof. Only one of those two side elements 32 is shown in the FIGURE. Each of the two side elements 32 is formed with a guide slot 34. Projecting laterally from the intermediate body 24 in mutually opposite relationship are guide elements 36 in the form of bars which are guided in the corresponding guide slots 34.

In addition two first bars 38 extend upwardly in mutually parallel orientation from the bottom element 30 of the base arrangement 22 which is fixed with respect to the seat. Only one of the two bars 38 is also shown in the Figure. The intermediate body 24 is formed with two first passages 40 into which the first bars 38 extend without play. The first bars 38 and the first passages 40 define a first linear guide along which the intermediate body 24 forming the first body is displaceable jointly with the head support 18 forming the second body, from the base position of being lowered into the opening 16 into a first raised extension position.

The head support 18 which forms the second body has two second bars 42 which are oriented in mutually parallel relationship and which project downwardly from the head support 18 and which extend into associated second passages 44 in the intermediate body 24. The second passages 44 are arranged laterally beside the first passages 40, at a spacing therefrom in the intermediate body 24. By displacement of the second bars 42 in the associated second passages 44 in the intermediate body 24 it is therefore possible for the head support 18 to be adjusted as desired in relation to the intermediate body 24 between the first extension position and a maximum position.

Each of the two first bars 38 which extend upwardly from the base arrangement 22 is formed with an opening 48 at its upward, that is to say distal end portion 46. The corresponding opening 48 serves to receive a spring-loaded slider 50 of a coupling device 52. The slider 50 is provided in the intermediate body 24 in transversely oriented relationship with the first bar 38 and the second bar 42 and is arranged to be linearly movable. The slider 50 is urged towards the first bar 38 by means of a spring element 54 arranged in an opening in the intermediate body 24.

Fixed in the respective second passage 44 of the intermediate body 24 at the upper end thereof is a sleeve or bush 56 which permits stepwise displacement of the head support 18 in relation to the intermediate body 24 from the first extension position to the maximum position.

At its lower, that is to say distal end portion 58, the second bar 42 is provided with an aperture 60 which in the axial direction is of a greater internal height than corresponds to the thickness of the slider 50. The aperture 60 serves to receive the slider 50 of the coupling device 52 when the head support 18 is moved from an extension position which is above the first extension position towards the intermediate body 24 which is fixed in the first extension position. In that situation, in the first extension position of the head support, when it is lowered onto the intermediate body 24, the inclined surface 62 at the distal end portion 58 of the second bar 42 comes to bear against a contact portion 64 of the slider 50 so that the slider 50 is moved out of the opening 48 in the distal end portion 46 of the first bar 38 and engages into the aperture 60 at the distal end portion 58 of the second bar 42. This means that, in this first extension position, the head support 18 can then be moved again jointly with the intermediate body 24 into the opening 16 in the backrest 10 of the vehicle seat 12.

What is claimed is:

1. A coupling device with a telescopically adjustable object, said telescopically adjustable object having a first body (24) and a second body (18), and said coupling device (52) is provided in such a way that said first body (24) can move jointly said second body (18) along a first linear guide (30,40) between a base position and a first extension position and from the first extension position said second body (18) only is adjustable linearly in relation to said first body (24) as far as a maximum position, characterized in that said first linear guide (38,40) has at least a stationary first bar (38) which is provided at its distal end portion (46) with an opening (48) defining the first extension position, and said first body (24) has a spring loaded slider (50) which forms the coupling device (52) and which in the first extension position engages into said opening (48) provided in said first bar (38), said first body (24) having at least one passage (44) for linear guidance of an associated second bar (42) of the second body (18), and said second bar (42) has a distal end portion (58) having an aperture (60) for said slider (50).

2. The coupling device of claim 1, characterized in that at its distal end said second bar (42) has an inclined surface (62) and that upon contraction of said object from the maximum position back into said first extension position, said slider (50) is displaced with a contact portion (64) in contact against said inclined surface (62) is such a way that said slider (50) is released from the opening (48) in said first bar (38) and at the same time engages into said aperture (60) in said second bar (42) and connects said second body (18) to said first body (24).

* * * * *